United States Patent
Ikeda et al.

(10) Patent No.: US 11,655,771 B2
(45) Date of Patent: May 23, 2023

(54) CONTROL DEVICE FOR INTERNAL COMBUSTION ENGINE

(71) Applicant: TOYOTA JIDOSHA KABUSHIKI KAISHA, Aichi-ken (JP)

(72) Inventors: Yuto Ikeda, Okazaki (JP); Yuki Nose, Nagoya (JP); Takanobu Gotoh, Obu (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/829,362

(22) Filed: Jun. 1, 2022

(65) Prior Publication Data
US 2023/0036865 A1 Feb. 2, 2023

(30) Foreign Application Priority Data
Jul. 27, 2021 (JP) .............................. JP2021-122456

(51) Int. Cl.
*F01N 3/00* (2006.01)
*F02D 41/02* (2006.01)
*F02D 41/14* (2006.01)
*F01N 3/023* (2006.01)
*F01N 3/10* (2006.01)

(52) U.S. Cl.
CPC .......... *F02D 41/029* (2013.01); *F01N 3/023* (2013.01); *F01N 3/101* (2013.01); *F02D 41/1454* (2013.01); *F02D 2041/0265* (2013.01); *F02D 2200/0802* (2013.01)

(58) Field of Classification Search
CPC .............. F02D 41/029; F02D 41/1454; F02D 2041/0265; F02D 2200/0802; F01N 3/023; F01N 3/101
See application file for complete search history.

(56) References Cited

U.S. PATENT DOCUMENTS

| | | | | |
|---|---|---|---|---|
| 7,854,114 | B2* | 12/2010 | England | F02D 41/0087 60/284 |
| 8,099,224 | B2* | 1/2012 | Tripathi | F02D 41/0087 123/478 |
| 2012/0102920 | A1* | 5/2012 | Pipis, Jr. | F01N 3/103 60/297 |
| 2015/0128567 | A1* | 5/2015 | Kondo | F01N 3/2066 60/285 |

(Continued)

FOREIGN PATENT DOCUMENTS

JP 2013249792 A 12/2013
WO 2013179132 A1 12/2013

*Primary Examiner* — Matthew T Largi
(74) *Attorney, Agent, or Firm* — Hauptman Ham, LLP (57) ABSTRACT

When an amount of particulate matter (PM) collected by a gasoline particulate filter (GPF) reaches a predetermined amount, a central processing unit (CPU) executes a regeneration process for regenerating the GPF. That is, the CPU stops supply of fuel to any one of cylinders #1 to #4, while increasing an amount of fuel supplied to remaining cylinders. When a temperature of a three-way catalyst becomes equal to or higher than a first temperature, the CPU increases an injection amount to lower a temperature of exhaust gas. When the temperature of the three-way catalyst becomes equal to or higher than the first temperature during the execution of the regeneration process, the CPU does not increase the injection amount.

5 Claims, 6 Drawing Sheets

(56) References Cited

U.S. PATENT DOCUMENTS

| | | | |
|---|---|---|---|
| 2016/0003169 A1* | 1/2016 | Leone | F02D 41/0087 |
| | | | 123/481 |
| 2017/0130630 A1* | 5/2017 | Younkins | F01N 13/009 |
| 2019/0226378 A1* | 7/2019 | Chen | F01N 9/00 |
| 2020/0025050 A1* | 1/2020 | Chen | F02D 41/0087 |

* cited by examiner

CONTROL DEVICE FOR INTERNAL COMBUSTION ENGINE

CROSS-REFERENCE TO RELATED APPLICATION

This application claims priority to Japanese Patent Application No. 2021-122456 filed on Jul. 27, 2021, incorporated herein by reference in its entirety.

BACKGROUND

1. Technical Field

The present disclosure relates to a control device for an internal combustion engine.

2. Description of Related Art

For example, the Japanese Unexamined Patent Application Publication No. 2013-249792 (JP 2013-249792 A) describes a control device for an internal combustion engine provided with an exhaust gas control device. This control device estimates the temperature of the exhaust gas control device. When the estimated temperature is equal to or higher than a determination value, the control device increases the amount of fuel injected from the fuel injection valve. This aims at lowering the temperature of the exhaust gas by the heat of vaporization of the fuel.

SUMMARY

The inventors have considered stopping the supply of fuel in some of the plurality of cylinders as a regeneration process for regenerating the exhaust gas control device. This aims at supplying oxygen to the exhaust gas control device. However, in that case, the temperature of the exhaust gas control device rises during the execution of the regeneration process, and when the amount of fuel is increased as described above, the temperature of the exhaust gas control device may rather rise. This is because a large amount of oxygen flowing into the exhaust gas control device from the cylinders in which the fuel supply is stopped reacts with the increased fuel and generates heat.

Hereinafter, means for solving the above issue and its operations and effects will be described.
1. Provided is a control device for an internal combustion engine. The control device is applied to the internal combustion engine including an exhaust gas control device in an exhaust passage. The internal combustion engine includes a plurality of cylinders and a fuel injection valve for supplying fuel to each of the cylinders. The control device executes a stop process, a temperature acquisition process, an increase process, and a prohibition process. The stop process is a process for stopping supply of fuel to some of the cylinders of the internal combustion engine and continuing the supply of the fuel to remaining cylinders. The temperature acquisition process is a process for acquiring a temperature of the exhaust gas control device. The increase process is a process for increasing an injection amount injected by the fuel injection valve when the temperature becomes equal to or higher than a first temperature. The prohibition process is a process for prohibiting both the stop process and the increase process from being executed at the same time.

In the above configuration, the prohibition process prohibits both the stop process and the increase process from being executed at the same time. Thus, when the temperature of the exhaust gas control device becomes equal to or higher than the first temperature during the execution of the stop process, the execution of the increase process is prohibited. Therefore, it is possible to avoid a situation in which a large amount of oxygen flowing into the exhaust gas control device from some cylinders oxidizes a large amount of uncombusted fuel increased by the increase process. Accordingly, it is possible to suppress the temperature of the exhaust gas control device from rising excessively during the execution of the stop process.
2. Provided is the control device for the internal combustion engine according to 1 described above. The prohibition process is a process for prohibiting execution of the increase process when the stop process is being executed. The control device executes a temperature control process when the stop process is executed. The temperature control process includes a process for setting the injection amount injected by the fuel injection valve such that an air-fuel ratio of an air-fuel mixture in the remaining cylinders is richer than a stoichiometric air-fuel ratio when the temperature is lower than a second temperature, and reducing the injection amount injected by the fuel injection valve of the remaining cylinders when the temperature is equal to or higher than the second temperature.

In the above configuration, by making the air-fuel ratio of the air-fuel mixture in the remaining cylinders richer than the stoichiometric air-fuel ratio, the uncombusted fuel flowing into the exhaust gas control device from the remaining cylinders is oxidized by the oxygen flowing into the exhaust gas control device from some cylinders. Therefore, the temperature of the exhaust gas control device can be raised. Further, in the above configuration, when the temperature of the exhaust gas control device becomes equal to or higher than the second temperature, the injection amount injected by the fuel injection valve of the remaining cylinders is reduced. As a result, the amount of uncombusted fuel flowing into the exhaust gas control device from the remaining cylinders can be reduced. Therefore, the amount of heat of oxidation generated by the exhaust gas control device can be reduced. Accordingly, in the above configuration, it is possible to suppress the temperature of the exhaust gas control device from rising excessively.
3. Provided is the control device for the internal combustion engine according to 2 described above. The second temperature is lower than the first temperature. In the above configuration, it is possible to suppress the temperature of the exhaust gas control device from rising significantly beyond the second temperature, which is smaller than the first temperature, by the temperature control process.
4. Provided is the control device for the internal combustion engine according to 2 described above. The second temperature is higher than the first temperature. In the above configuration, it is possible to suppress the temperature of the exhaust gas control device from rising significantly beyond the second temperature by the temperature control process. Therefore, the amount in which the temperature of the exhaust gas control device exceeds the first temperature can be set to about the difference between the second temperature and the first temperature.
5. Provided is the control device for the internal combustion engine according to 1 described above. The prohibition process is a process for prohibiting execution of the stop process when the increase process is executed. In the above configuration, when the increase process is executed, the execution of the stop process is prohibited. Therefore, it is possible to suppress the temperature of the exhaust gas control device from excessively rising beyond the first temperature by the increase process, when the temperature of the exhaust gas control device becomes equal to or higher than the first temperature.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Hereinafter, a first embodiment will be described with reference to the drawings.

Figure 1:
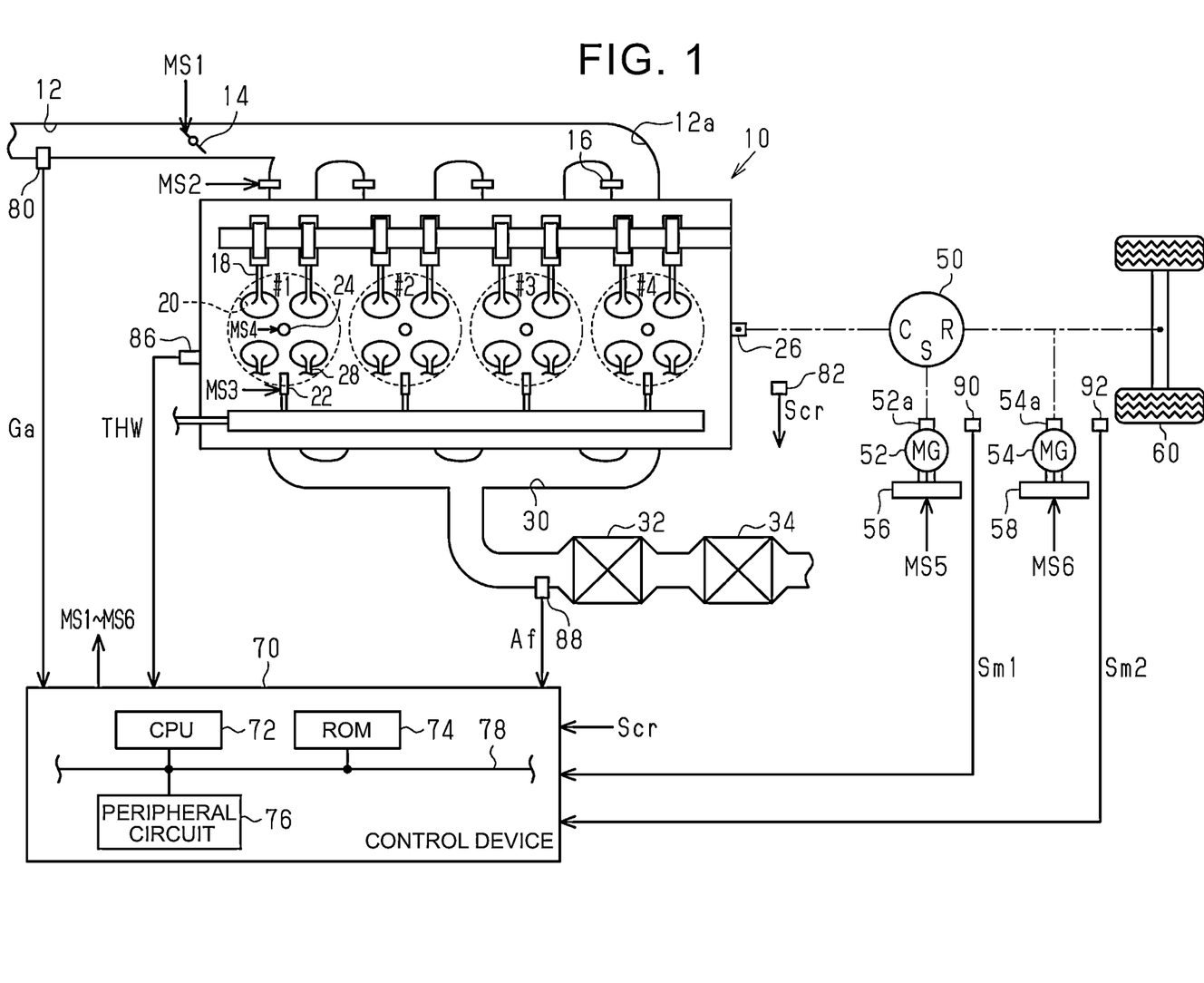
FIG. 1 is a diagram showing a configuration of a drive system and a control device according to the first embodiment.

As shown in FIG. 1, an internal combustion engine 10 includes four cylinders #1 to #4. A throttle valve 14 is provided in an intake passage 12 of the internal combustion engine 10. An intake port 12a, which is a downstream portion of the intake passage 12, is provided with a port injection valve 16 for injecting fuel into the intake port 12a. The air taken into the intake passage 12 and the fuel injected from the port injection valve 16 flow into a combustion chamber 20 as an intake valve 18 opens. Fuel is injected into the combustion chamber 20 from an in-cylinder injection valve 22. The air-fuel mixture that is a mixture of the air in the combustion chamber 20 and the fuel is subjected to combustion with the spark discharge of a spark plug 24. The combustion energy generated at that time is converted into the rotation energy of a crank shaft 26.

The air-fuel mixture subjected to combustion in the combustion chamber 20 is discharged to an exhaust passage 30 as exhaust gas when an exhaust valve 28 is opened. The exhaust passage 30 is provided with a three-way catalyst 32 having an oxygen storage capacity and a gasoline particulate filter (GPF) 34. In the present embodiment, as the GPF 34, a filter in which a three-way catalyst having an oxygen storage capacity is supported on a filter for collecting particulate matter (PM) is assumed.

The crank shaft 26 is mechanically connected to a carrier C of a planetary gear mechanism 50 constituting a power splitting device. A rotation shaft 52a of a first motor generator 52 is mechanically connected to a sun gear S of the planetary gear mechanism 50. A rotation shaft 54a of a second motor generator 54 and drive wheels 60 are mechanically connected to a ring gear R of the planetary gear mechanism 50. An alternating current (AC) voltage is applied to a terminal of the first motor generator 52 by an inverter 56. Further, an AC voltage is applied to a terminal of the second motor generator 54 by an inverter 58.

In order to control the torque, the exhaust component ratio, and the like, which are control amounts of the internal combustion engine 10 as a control target, a control device 70 operates operation units of the internal combustion engine 10 such as the throttle valve 14, the port injection valve 16, the in-cylinder injection valve 22, and the spark plug 24. The control device 70 operates the inverter 56 to control the rotation speed, which is the control amount of the first motor generator 52 as the control target. The control device 70 operates the inverter 58 to control the torque, which is the control amount of the second motor generator 54 as the control target. FIG. 1 shows operation signals MS1 to MS6 of each of the throttle valve 14, the port injection valve 16, the in-cylinder injection valve 22, the spark plug 24, and the inverters 56, 58. The control device 70 refers to the intake air amount Ga detected by an air flow meter 80 and the output signal Scr of a crank angle sensor 82 in order to control the control amount of the internal combustion engine 10. Further, the control device 70 refers to the coolant temperature THW detected by a coolant temperature sensor 86 and the air-fuel ratio $\Delta f$ detected by an air-fuel ratio sensor 88 provided upstream of the three-way catalyst 32. The control device 70 refers to the output signal Sm1 of a first rotation angle sensor 90 that detects the rotation angle of the first motor generator 52 in order to control the control amount of the first motor generator 52. The control device 70 also refers to the output signal Sm2 of a second rotation angle sensor 92 that detects the rotation angle of the second motor generator 54 in order to control the control amount of the second motor generator 54.

The control device 70 includes a central processing unit (CPU) 72, a read only memory (ROM) 74, a peripheral circuit 76, and a communication line 78. The CPU 72, the ROM 74, and the peripheral circuit 76 can communicate with each other by the communication line 78. Here, the peripheral circuit 76 includes a circuit that generates a clock signal defining the internal operation, a power supply circuit, a reset circuit, and the like. The control device 70 controls the control amount when the CPU 72 executes the program stored in the ROM 74.

The CPU 72 executes a process for determining whether to execute the regeneration process of the GPF 34, a fuel increase process for overheat protection of the three-way catalyst 32, and a process for regenerating the GPF 34 according to the program stored in the ROM 74. In the following, the above will be described in order.

Processing Related to Determining Whether to Execute Regeneration Process

Figure 2:
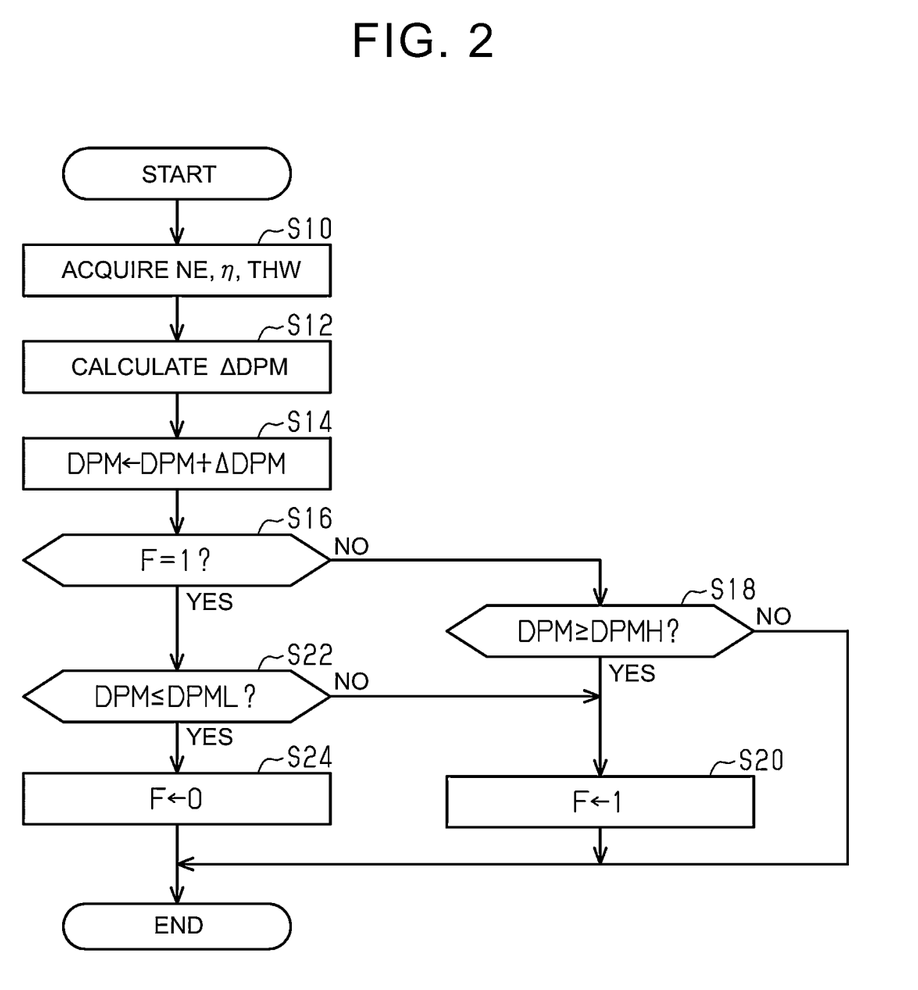
FIG. 2 is a flowchart showing a procedure of processes executed by the control device according to the first embodiment.

FIG. 2 shows the procedure of the regeneration process. The processes shown in FIG. 2 are realized when the CPU 72 repeatedly executes the program stored in the ROM 74, for example, at a predetermined cycle. In the following, the step number of each process is represented by a number prefixed with S.

In the series of processes shown in FIG. 2, the CPU 72 first acquires the rotation speed NE, the filling efficiency $\eta$, and the coolant temperature THW (S10). The rotation speed NE is calculated by the CPU 72 based on the output signal Scr. The filling efficiency $\eta$ is calculated by the CPU 72 based on the rotation speed NE and the intake air amount Ga. Next, the CPU 72 calculates the update amount $\Delta DPM$ of the accumulated amount DPM based on the rotation speed NE, the filling efficiency and the coolant temperature THW (S12). Here, the accumulated amount DPM is the amount of the PM collected in the GPF 34. Specifically, the CPU 72 calculates the amount of the PM in the exhaust gas discharged to the exhaust passage 30 based on the rotation speed NE, the filling efficiency and the coolant temperature THW. Further, the CPU 72 calculates the temperature of the GPF 34 based on the temperature Tcat of the three-way catalyst 32 calculated by the process described later, the rotation speed NE, and the filling efficiency η. Then, the CPU 72 calculates the update amount ΔDPM based on the amount of the PM in the exhaust gas and the temperature of the GPF 34. At the time of executing the process of S56 described later, the update amount ΔDPM may be calculated in consideration of the fact that the process is under execution.

Next, the CPU 72 updates the accumulated amount DPM according to the update amount ΔDPM (S14). Subsequently, the CPU 72 determines whether the flag F is "1" (S16). The flag F being "1" indicates that the regeneration process that is a process for combusting and removing the PM in the GPF 34 is being executed, while the flag F being "0" indicates that the regeneration process is not being executed. When the CPU 72 determines that the value is "0" (S16: NO), the CPU 72 determines whether the accumulated amount DPM is equal to or larger than the regeneration execution value DPMH (S18). The regeneration execution value DPMH is set to a value at which a large amount of the PM is collected by the GPF 34 and it is desired to remove the PM.

When the CPU 72 determines that the accumulated amount DPM is equal to or larger than the regeneration execution value DPMH (S18: YES), the CPU 72 substitutes "1" into the flag F to execute the regeneration process (S20). When the CPU 72 determines that the flag F is "1" (S16: YES), the CPU 72 determines whether the accumulated amount DPM is equal to or smaller than the stop threshold value DPML (S22). The stop threshold value DPML is set to a value at which the amount of the PM collected in the GPF 34 is sufficiently small and the regeneration process may be stopped. When the CPU 72 determines that the accumulated amount DPM is larger than the stop threshold value DPML (S22: NO), the CPU 72 shifts to the process of S20.

On the other hand, when the accumulated amount DPM is equal or smaller than the stop threshold value DPML (S24: YES), the CPU 72 substitutes "0" into the flag F (S24). The CPU 72 temporarily ends the series of processes shown in FIG. 2 when the processes of S20 and S24 are completed and when a negative determination is made in the process of S18.

Fuel Increase Process for Overheat Protection of Three-Way Catalyst 32

Figure 3:
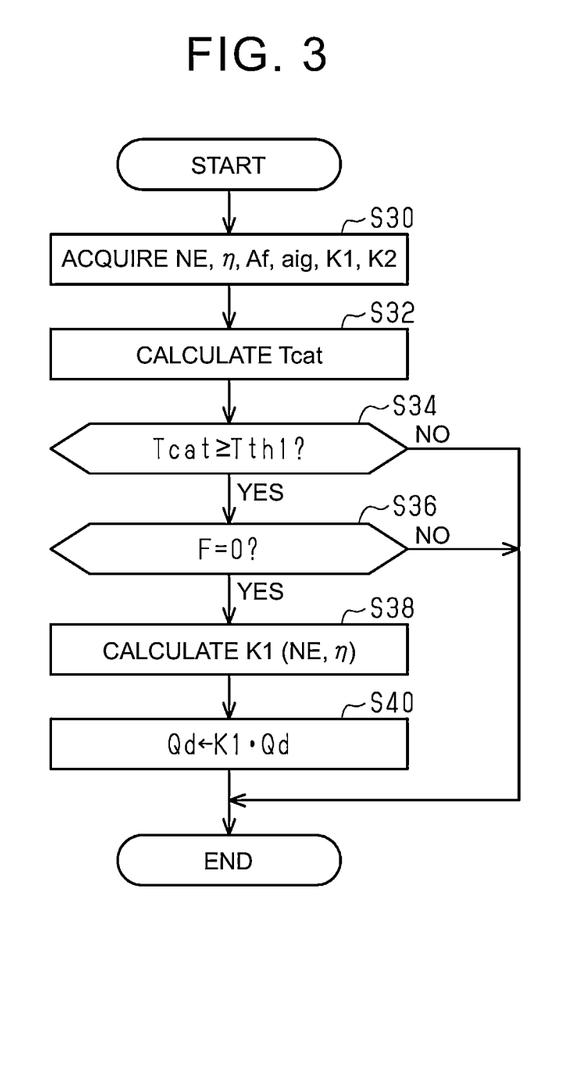
FIG. 3 is a flowchart showing a procedure of processes executed by the control device according to the first embodiment.

FIG. 3 shows a procedure for the fuel increase process. The processes shown in FIG. 3 are realized when the CPU 72 repeatedly executes the program stored in the ROM 74, for example, at a predetermined cycle.

In the series of processes shown in FIG. 3, the CPU 72 first acquires the rotation speed NE of the crank shaft 26, the filling efficiency η, the air-fuel ratio Af, the ignition timing aig, the increase coefficient K1, and the regeneration coefficient K2 (S30). The increase coefficient K1 is a coefficient indicating the ratio of increasing the injection amount when the process of increasing the injection amount is being executed in order to protect the three-way catalyst 32 from overheating. The increase coefficient K1 is "1" when the above-mentioned increase process is not being executed. The regeneration coefficient K2 is a coefficient indicating the ratio of increasing the injection amount when the regeneration process of the GPF 34 is being executed. The regeneration coefficient K2 is "1" when the regeneration process of the GPF 34 is not being executed.

Next, the CPU 72 calculates the temperature Tcat of the three-way catalyst 32 based on the rotation speed NE, the filling efficiency η, the air-fuel ratio Af, the ignition timing aig, the increase coefficient K1, and the regeneration coefficient K2 (S32). The CPU 72 calculates the temperature Tcat to a larger value when the filling efficiency η is large than when the filling efficiency η is small. Further, the CPU 72 calculates the temperature Tcat to a larger value when the amount of a retard angle of the ignition timing aig with respect to the maximum brake torque (MBT) is large than when the amount is small. Further, the CPU 72 calculates the temperature Tcat to a smaller value when the increase coefficient K1 is large than when the increase coefficient K1 is small. Further, the CPU 72 calculates the temperature Tcat to a larger value when the regeneration coefficient K2 is large than when the regeneration coefficient K2 is small.

Specifically, for example, the CPU 72 may correct the base value of the temperature Tcat calculated by inputting the rotation speed NE and the filling efficiency η by using the ignition timing aig, the increase coefficient K1, and the regeneration coefficient K2, to calculate the temperature Tcat. In the calculation process of the temperature Tcat, the CPU 72 takes into account the oxygen storage amount of the three-way catalyst 32 calculated according to the air-fuel ratio Af. At this time, for example, when the air-fuel ratio Af is larger than the stoichiometric air-fuel ratio in a state where the oxygen storage amount is smaller than the maximum value, it is desirable that the CPU 72 take into account the temperature rise of the three-way catalyst 32 that occurs when the oxygen storage amount increases to calculate the temperature Tcat. Further, for example, when the air-fuel ratio Af is smaller than the stoichiometric air-fuel ratio in a state where the oxygen storage amount is equal to or larger than a predetermined amount, it is desirable to take into account the heat of oxidation of the uncombusted fuel in the three-way catalyst 32 to calculate the temperature Tcat.

Next, the CPU 72 determines whether the temperature Tcat is equal to or higher than the first temperature Tth1 (S34). The first temperature Tth1 is set according to the upper limit value of the allowable temperature range of the three-way catalyst 32. Specifically, the first temperature Tth1 is set to a value smaller than the upper limit value by a predetermined margin amount.

When the CPU 72 determines that the temperature Tcat is equal to or higher than the first temperature Tth1 (S34: YES), the CPU 72 determines whether the flag F is "0" (S36). The processes of S34 and S36 are processes for determining whether the execution condition of the process of increasing the injection amount for protecting the three-way catalyst 32 from overheating is satisfied. That is, the execution condition is a condition that the logical product of the following condition (a) and condition (b) is true.

Condition (a): a condition that the temperature Tcat is equal to or higher than the first temperature Tth1

Condition (b): a condition that the regeneration process of GPF 34 is not being executed When the CPU 72 determines that the flag F is "0" (S36: YES), the CPU 72 calculates the increase coefficient K1 by inputting the rotation speed NE and the filling efficiency η that define the operation point of the internal combustion engine 10 (S38). This considers the fact that the temperature of the exhaust gas differs depending on the operation point. The process of increasing the injection amount by the increase coefficient K1 is performed to lower the temperature of the exhaust gas discharged to the exhaust passage 30 by the heat of vaporization of the fuel.

Since the temperature of the exhaust gas is different when the injection amount is not increased, the increase rate required for lowering the temperature of the exhaust gas to a desired temperature differs depending on the operation point.

This process may be a process of performing a map calculation of the increase coefficient K1 by the CPU 72 in a state where the map data is stored in the ROM 74, for example. Here, the map data is data in which the rotation speed NE and the filling efficiency η are input variables and the increase coefficient K1 is an output variable. The map data is a set data of a discrete value of an input variable and a value of an output variable corresponding to each of the values of the input variable. In the map calculation, when the value of the input variable matches any of the values of the input variable in the map data, the corresponding value of the output variable in the map data may be used as the calculation result. Further, in the map calculation, when the value of the input variable matches none of the values of the input variable in the map data, the value obtained by interpolating the values of a plurality of output variables included in the map data may be used as the calculation result.

Next, the CPU 72 increases and corrects the required injection amount Qd by the increase coefficient K1 (S40). The required injection amount Qd is the amount of fuel required for each of the cylinders #1 to #4 in one combustion cycle. The required injection amount Qd before correction may be, for example, the amount of fuel required to make the air-fuel ratio of the air-fuel mixture in the combustion chamber 20 the stoichiometric air-fuel ratio. This amount of fuel can be realized, for example, by the operation amount of open loop control obtained by multiplying the filling efficiency η by a predetermined coefficient. Further, for example, the amount of fuel may be realized by correcting the operation amount of the open loop control according to the operation amount required for the feedback control to the target value of the air-fuel ratio Af.

The CPU 72 temporarily ends the series of processes shown in FIG. 3 when the process of S40 is completed and when a negative determination is made in the processes of S34 and S36.

Process Related to Regeneration of GPF 34

Figure 4:
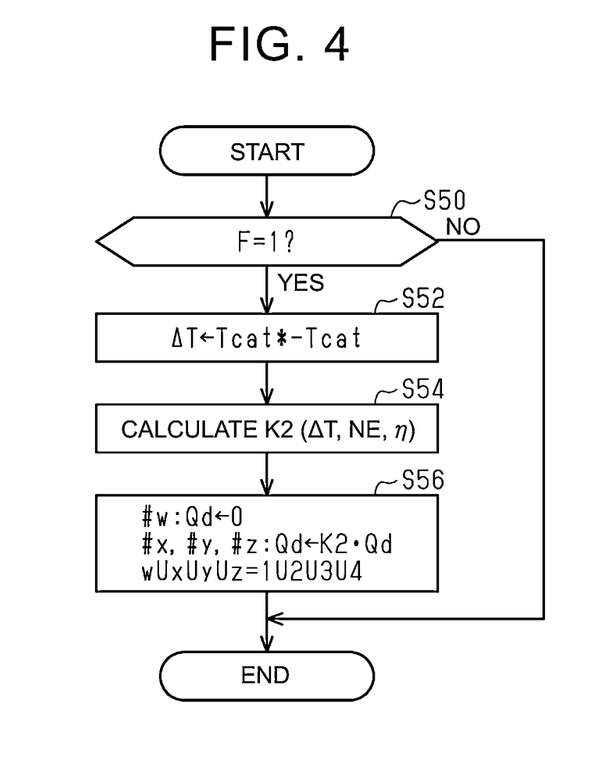
FIG. 4 is a flowchart showing a procedure of processes executed by the control device according to the first embodiment.

FIG. 4 shows a procedure for the process related to regeneration of the GPF 34. The processes shown in FIG. 4 are realized when the CPU 72 repeatedly executes the program stored in the ROM 74, for example, at a predetermined cycle.

In the series of processes shown in FIG. 4, the CPU 72 first determines whether the flag F is "1" (S50). When the CPU 72 determines that the flag F is "1" (S50: YES), the CPU 72 substitutes the value obtained by subtracting the temperature Tcat from the target temperature Tcat* into the difference ΔT (S52). The target temperature Tcat* is a target value of the temperature Tcat of the three-way catalyst 32 at the time of the regeneration process of the GPF 34. The target temperature Tcat* is set to a temperature at which the temperature of the GPF 34 can be raised to a temperature at which the PM can be combusted and removed.

The CPU 72 calculates the regeneration coefficient K2 by inputting the rotation speed NE and the filling efficiency η, which are variables defining the operation point of the internal combustion engine 10, and the difference ΔT (S54). The regeneration coefficient K2 indicates the rate at which the injection amount is increased during the regeneration process of the GPF 34. The regeneration coefficient K2 is set to a value equal to or larger than "1". The CPU 72 calculates the regeneration coefficient K2 to a larger value when the difference ΔT is large than when the difference ΔT is small. Further, the CPU 72 calculates the value of the regeneration coefficient K2 to a different value according to the operation point of the internal combustion engine 10 even when the magnitude of the difference ΔT is the same. This considers the fact that the temperature of the exhaust gas when the amount is not increased depends on the operation point.

This process may be realized, for example, by calculating the regeneration coefficient K2 when the CPU 72 performs a map calculation on the map data stored in advance in the ROM 74. Here, the map data is data in which the difference ΔT, the rotation speed NE, and the filling efficiency η are used as input variables, and the regeneration coefficient K2 is used as an output variable.

Then, the CPU 72 stops the injection of fuel from the port injection valve 16 and the in-cylinder injection valve 22 of any one of the cylinders #1 to #4 (S56). Further, the CPU 72 corrects the required injection amount Qd of the remaining cylinders by the regeneration coefficient K2. That is, the CPU 72 makes the air-fuel ratio of the air-fuel mixture in the combustion chamber 20 of the remaining cylinders richer than the stoichiometric air-fuel ratio. This process is a process for raising the temperature of the GPF 34 by discharging oxygen and uncombusted fuel to the exhaust passage 30, and combusting and removing the PM collected by the GPF 34. That is, by discharging oxygen and uncombusted fuel to the exhaust passage 30, the uncombusted fuel is combusted in the three-way catalyst 32 and the like to raise the temperature of the exhaust gas. This makes it possible to raise the temperature of the GPF 34. Further, by supplying oxygen to the GPF 34, the PM collected by the GPF 34 can be combusted and removed.

The CPU 72 periodically switches the cylinder for stopping the injection of fuel. The switching cycle is, for example, a predetermined number of times one combustion cycle. Here, the predetermined number may be, for example, a number equal to or larger than 100.

The CPU 72 temporarily ends the series of processes shown in FIG. 4 when the process of S56 is completed and when a negative determination is made in the process of S50.

Here, the operation and effect of the present embodiment will be described.

Figure 5:
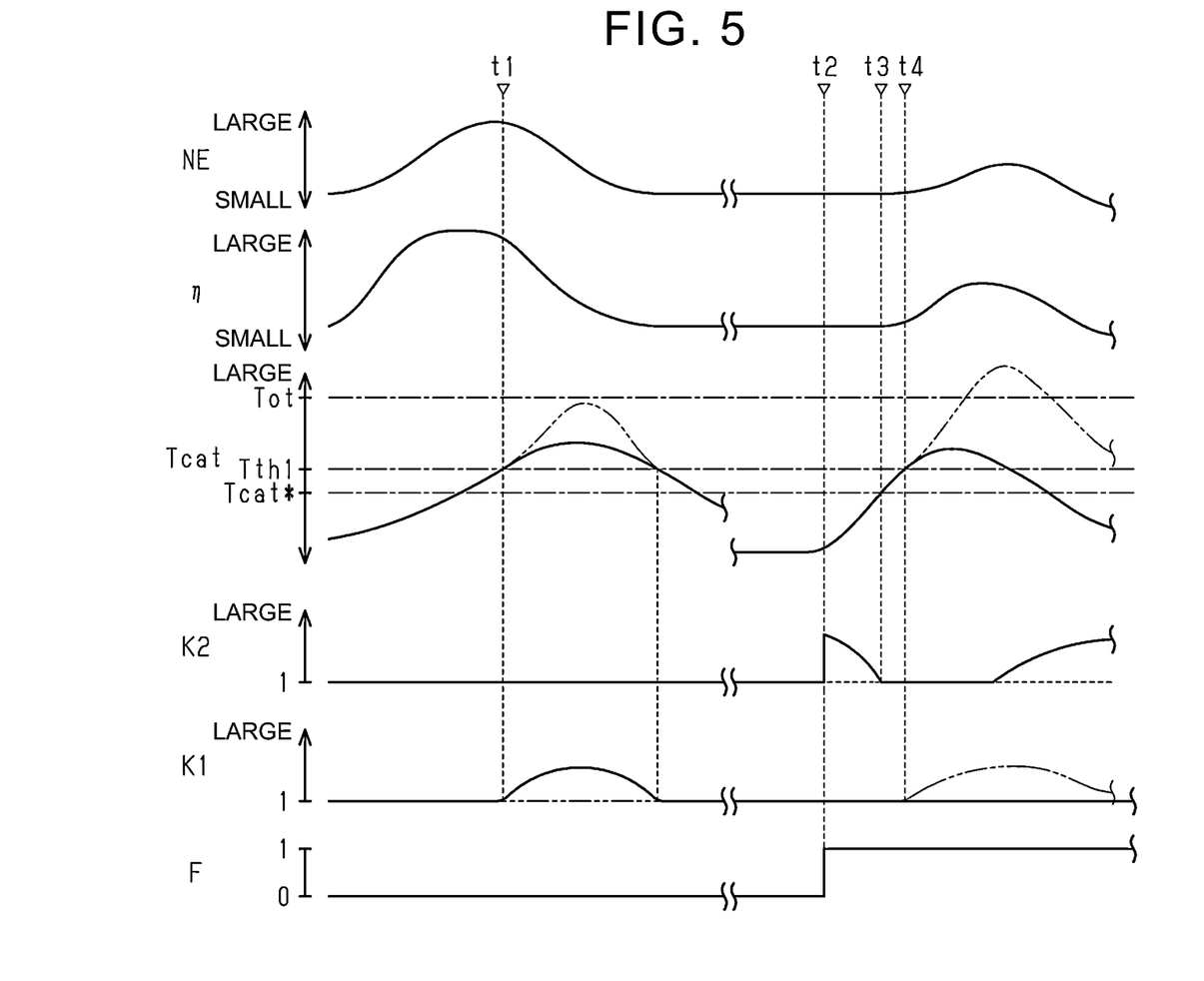
FIG. 5 is a time chart showing the effect of the first embodiment.

FIG. 5 shows changes in the rotation speed NE, the filling efficiency η, the temperature Tcat, the regeneration coefficient K2, the increase coefficient K1, and the flag F.

As shown in FIG. 5, when the regeneration process is not being executed, the CPU 72 raises the increase coefficient K1 to a value larger than "1" at time t1 when the temperature Tcat becomes equal to or higher than the first temperature Tth1. As a result, the temperature of the exhaust gas drops due to the heat of vaporization of the injected fuel. Therefore, an increase in the temperature Tcat can be suppressed. In FIG. 5, the long dashed double-short dashed lines show a case where the increase coefficient K1 is not increased. In that case, the temperature Tcat greatly rises beyond the first temperature Tth1.

When the regeneration process is started at time t2, the CPU 72 raises the regeneration coefficient K2 to a value larger than "1". The CPU 72 calculates the regeneration coefficient K2 to a larger value as the temperature Tcat is lower than the target temperature Tcat*. Then, the CPU 72 sets the regeneration coefficient K2 to "1" at time t3 when the temperature Tcat exceeds the target temperature Tcat*. Further, the CPU 72 fixes the increase coefficient K1 to "1" even at time t4 when the temperature Tcat becomes equal to or higher than the first temperature Tth1 and after. This is because the above condition (b) is included in the execution condition of the injection amount increase process by the increase coefficient K1.

In FIG. 5, the long dashed double-short dashed lines show a case where the above condition (b) is not included in the execution condition of the increase process. In that case, when the temperature Tcat becomes equal to or higher than the first temperature Tth1 at time t4, the CPU 72 executes the increase process by increasing the increase coefficient K1 beyond "1". In that case, the amount of uncombusted fuel discharged into the exhaust gas increases. On the other hand, a large amount of oxygen flows into the three-way catalyst 32 by the regeneration process. Therefore, the temperature of the three-way catalyst 32 rises significantly due to the reaction heat when the uncombusted fuel in the exhaust gas is oxidized by the oxygen flowing into the three-way catalyst 32. FIG. 5 shows an example in which the temperature Tcat rises beyond the upper limit value Tot of the allowable temperature of the three-way catalyst 32.

Figure 6:
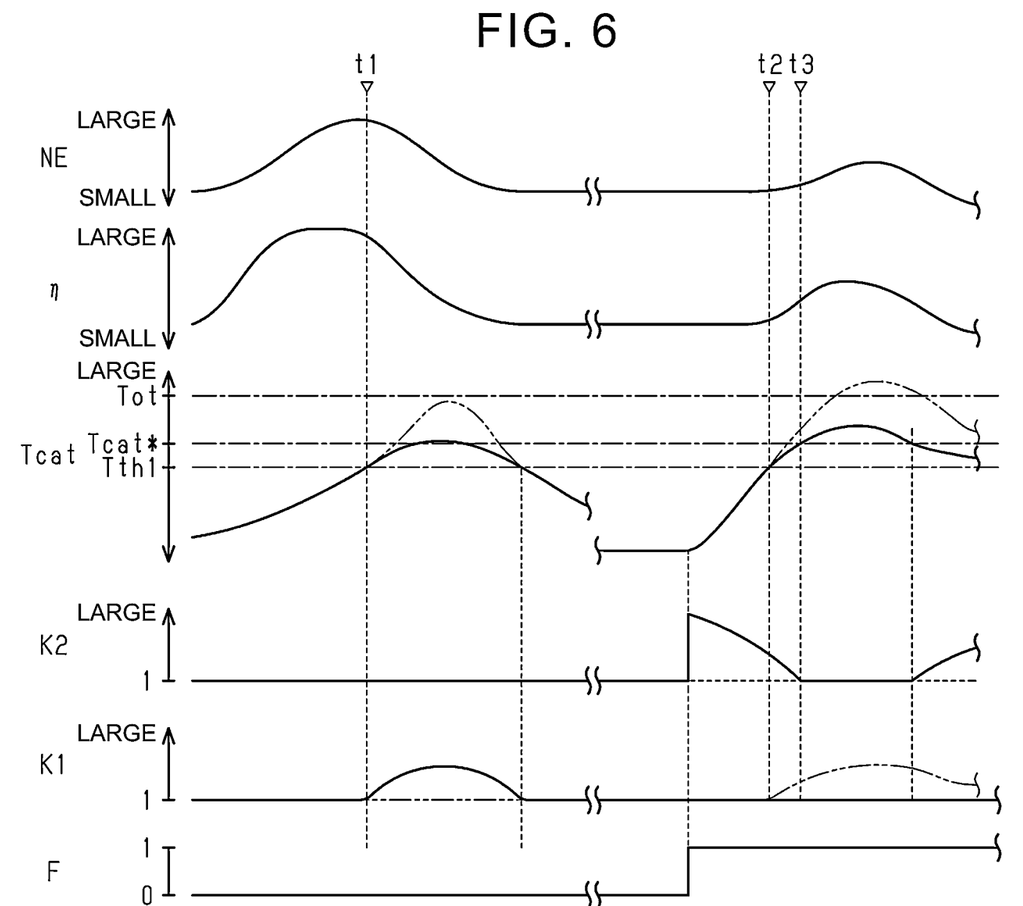
FIG. 6 is a time chart showing the effect of the first embodiment.

In the example shown in FIG. 5, the target temperature Tcat* is set to a value smaller than the first temperature Tth1, but the present disclosure is not limited to this. FIG. 6 shows an example in which the target temperature Tcat* is set to a value larger than the first temperature Tth1.

Even in the example shown in FIG. 6, the CPU 72 maintains the value of the increase coefficient K1 at "1" even at time t2 when the temperature Tcat becomes equal to or higher than the first temperature Tth1 and after. However, the CPU 72 sets the regeneration coefficient K2 to a value larger than "1", assuming that the temperature Tcat has not yet reached the target temperature Tcat* even at time t2 and after. That is, the injection amount is increased. Then, the CPU 72 sets the regeneration coefficient K2 to "1" at time t3 when the temperature Tcat reaches the target temperature Tcat*.

As described above, the CPU 72 does not execute the injection amount increase process aimed at lowering the temperature of the exhaust gas during the regeneration process. Instead, the CPU 72 performs feedback control so that the temperature Tcat does not exceed the target temperature Tcat* during the regeneration process. Here, the CPU 72 sets the regeneration coefficient K2 to a smaller value when the temperature Tcat is high than when the temperature Tcat is low. That is, the increase amount is set to a smaller value when the temperature Tcat is high than when the temperature Tcat is low. In particular, when the temperature Tcat is equal to or higher than the target temperature Tcat*, the CPU 72 sets the increase amount to zero.

As a result, it is possible to suppress the temperature of the three-way catalyst 32 from rising excessively.

Second Embodiment

Hereinafter, the second embodiment will be described with reference to the drawings, focusing on the differences from the first embodiment.

In the first embodiment, during the regeneration process, the injection amount increase process using the increase coefficient K1 is prohibited. However, in the present embodiment, when the condition that the temperature Tcat is equal to or higher than the first temperature Tth1, which is the condition for executing the increase process, is satisfied, the execution of the regeneration process is prohibited.

Figure 7:
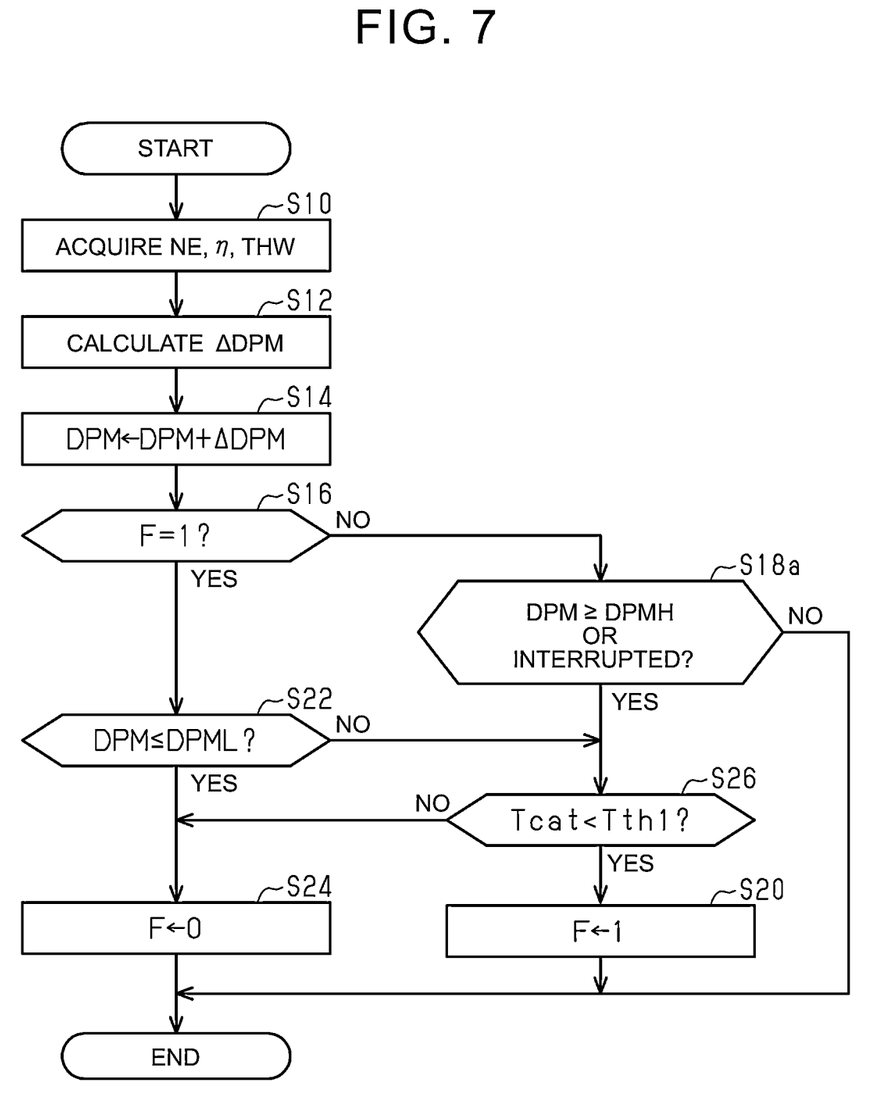
FIG. 7 is a flowchart showing a procedure of processes executed by the control device according to a second embodiment.

FIG. 7 shows a procedure for determining whether to execute the regeneration process according to the present embodiment. The processes shown in FIG. 7 are realized when the CPU 72 repeatedly executes the program stored in the ROM 74, for example, at a predetermined cycle. In FIG. 7, for the process corresponding to the process shown in FIG. 2, the same step number is assigned and the description thereof will be omitted for convenience of description.

In the series of processes shown in FIG. 7, when the CPU 72 determines that the flag F is "0" (S16: NO), the CPU 72 determines whether the logical product of the following condition (c) and condition (d) is true (S18a).

Condition (c): a condition that the accumulated amount DPM is equal to or larger than the regeneration execution value DPMH Condition (d): a determination process that the regeneration process of the GPF 34 is interrupted The interruption of the regeneration process is an event caused by a negative determination in the process of S26 described later during the execution of the regeneration process.

When the CPU 72 determines that the logical product is true (S18a: YES) and when the CPU 72 makes a negative determination in the process of S22, the CPU 72 determines whether the condition (e) indicating that the temperature Tcat is lower than the first temperature Tth1 is satisfied (S26). When the CPU 72 determines that the condition (e) is satisfied (S26: YES), the CPU 72 shifts to the process of S20. That is, in the present embodiment, the execution condition of the regeneration process is a condition that the logical product of the condition (c), the condition (d), and the condition (e) is true.

On the other hand, when the CPU 72 determines that the temperature Tcat is equal to or higher than the first temperature Tth1 (S26: NO), the CPU 72 shifts to the process of S24. As described above, when the temperature Tcat is equal to or higher than the first temperature Tth1, the CPU 72 does not execute the regeneration process of the GPF 34 even when the regeneration request of the CPU 72 is generated due to the satisfaction of the condition (c). Thus, the fuel is increased by the increase coefficient K1 in a state where a large amount of oxygen is not supplied to the three-way catalyst 32. Therefore, since the exhaust gas that is limited to a low temperature flows into the three-way catalyst 32, it is possible to suppress the temperature of the three-way catalyst 32 from rising excessively.

Further, the CPU 72 interrupts the regeneration process when the temperature Tcat of the three-way catalyst 32 becomes equal to or higher than the first temperature Tth1 during the execution of the regeneration process. Thus, the process of supplying a large amount of oxygen to the three-way catalyst 32 is interrupted. By increasing the amount of fuel by the process of FIG. 3, the temperature of the exhaust gas discharged from each of the cylinders #1 to #4 can be limited to a low temperature. As a result, it is possible to suppress the temperature of the three-way catalyst 32 from rising excessively.

Correspondence

The correspondence between the matters in the above embodiment and the matters described in the above column of "summary" is as follows. In the following, the correspondence is shown for each number of the solution means described in the column of "summary" [1] The exhaust gas control device corresponds to the three-way catalyst 32 and the GPF 34. The stop process corresponds to the process of S56. The temperature acquisition process corresponds to the process of S32. The increase process corresponds to the process of S40. In FIG. 3, the prohibition process corresponds to executing the process of S36 as an execution condition of the process of S40. In FIG. 7, the prohibition process corresponds to the process of S26. [2] The second temperature corresponds to the target temperature Tcat*. The description in [3] corresponds to the process illustrated in FIG. 5. The description in [4] corresponds to the process illustrated in FIG. 6. The description in [5] corresponds to the process in FIG. 7.

Other Embodiments

The present embodiment can be modified and implemented as follows. The present embodiment and modification examples described below may be carried out in combination of each other within a technically consistent range.

First Temperature and Second Temperature

FIGS. 5 and 6 show examples in which the first temperature Tth1 and the target temperature Tcat* are values different from each other, but the present disclosure is not limited to this.

The second temperature, which is the temperature at which the value of the regeneration coefficient K2 is made to be equal to or smaller than "1", is not limited to the target temperature Tcat*. For example, as described in the column of "Temperature Control Process", when the temperature Tcat is controlled to be in the region of equal to or higher than the lower limit value and equal to or lower than the upper limit value, the upper limit value may be set as the second temperature.

Temperature Control Process

In the above embodiment, the regeneration coefficient K2 is variably set according to the difference ΔT, the filling efficiency η as a variable indicating the load, and the rotation speed NE, but the present disclosure is not limited to this. For example, as a variable indicating the load, the accelerator operation amount may be used instead of the filling efficiency It is not essential to variably set the regeneration coefficient K2 according to the difference ΔT, the variable indicating the load, and the rotation speed NE. For example, the regeneration coefficient K2 may be variably set based on the difference ΔT and either one of the variable indicating the load and the rotation speed NE.

It is not essential to variably set the regeneration coefficient K2 according to at least one of the variable indicating the load and the rotation speed NE. For example, the output value of the proportional element with the difference ΔT as an input may be used as the regeneration coefficient K2. Further, for example, the sum of the output value of the proportional element and the output value of the integrating element with the difference ΔT as an input may be used as the regeneration coefficient K2.

In the above embodiment, the minimum value of the regeneration coefficient K2 is set to "1", but the present disclosure is not limited to this. For example, the value may be slightly smaller than "1". In that case, it is possible to more reliably suppress the amount of uncombusted fuel discharged from the cylinder in which the fuel supply is continued from exceeding the amount of oxygen discharged from the cylinder.

The regeneration coefficient K2 is not limited to the regeneration coefficient K2 set according to the difference between the target temperature Tcat* and the temperature Tcat. For example, the upper limit value and the lower limit value of the temperature Tcat may be set, and the operation amount for controlling the temperature Tcat to be within the region of equal to or higher than the lower limit value and equal to or lower than the upper limit value may be set as the regeneration coefficient K2. In that case, when the temperature Tcat is lower than the lower limit value, the regeneration coefficient K2 may be set to a value larger than "1". Further, when the temperature Tcat is higher than the upper limit value, the regeneration coefficient K2 may be set to a value equal to or smaller than "1". When the temperature Tcat is in the above region, the regeneration coefficient K2 may be set to "1".

Increase Process

In the above embodiment, the magnitude of the increase coefficient K1 is set according to the rotation speed NE and the filling efficiency η as a variable indicating the load, regardless of the temperature Tcat, but the present disclosure is not limited to this. For example, the magnitude of the increase coefficient K1 may be variably set according to the temperature Tcat, the rotation speed NE, and the variable indicating the load. In that case, even when the values of the rotation speed NE and the variable indicating the load are the same, the increase coefficient K1 may be set to a larger value when the temperature Tcat is large than when the temperature Tcat is small.

In the above embodiment, the increase coefficient K1 is set according to the rotation speed NE and the filling efficiency n as the variable indicating the load, but the present disclosure is not limited to this. For example, the accelerator operation amount may be used as the variable indicating the load. Further, the increase coefficient K1 may be variably set according to either one of the two values of the rotation speed NE and the variable indicating the load. Furthermore, it is not essential to variably set the increase coefficient K1 according to at least one of the two values of the rotation speed NE and the variable indicating the load.

Prohibition Process

In FIG. 7, when the temperature Tcat becomes equal to or higher than the first temperature Tth1 during the execution of the regeneration process of GPF 34, the regeneration process is interrupted. The increase coefficient K1 is thus immediately set to a value larger than "1" by the process shown in FIG. 3, but the present disclosure is not limited to this. For example, the process of S40 may be prohibited until a predetermined time elapses after the interruption of the regeneration process. In other words, a delay may be provided in the timing of starting the process of S40 with respect to the timing of interrupting the regeneration process.

Stop Process

The stop process is not limited to the regeneration process. For example, the stop process may be a process of stopping the supply of fuel in some cylinders in order to adjust the output of the internal combustion engine 10. In that case, the air-fuel ratio of the air-fuel mixture in a cylinder different from the some cylinders may be set to the stoichiometric air-fuel ratio. Furthermore, for example, the stop process may be a process of stopping the supply of fuel to only some cylinders and executing control to set the air-fuel ratios of the air-fuel mixtures in the remaining cylinders to the stoichiometric air-fuel ratio when the oxygen storage amount of the three-way catalyst 32 is equal to or smaller than a specified value.

Exhaust Gas Control Device

The GPF 34 is not limited to the GPF provided downstream of the three-way catalyst 32 in the exhaust passage 30. Further, it is not essential that the post-processing device is provided with the GPF 34. The GPF 34 is not limited to a filter on which a three-way catalyst is supported. For example, when a three-way catalyst is provided upstream, the GPF 34 may be only a filter.

Control Device

The control device is not limited to a device that includes the CPU 72 and the ROM 74 and executes software processing. For example, the control device may include a dedicated hardware circuit such as an application-specific integrated circuit (ASIC) that performs hardware processing on at least a part of what has been subjected to software-processing in the above embodiment. That is, the control device only needs to include any of the following configurations (a) to (c). (a) A processing device that executes all of the above processes according to a program and a program storage device such as a ROM for storing the program (b) A processing device that executes a part of the above processes according to a program, a program storage device, and a dedicated hardware circuit for executing the remaining processes (c) A dedicated hardware circuit that executes all of the above processes Here, multiple software execution devices provided with the processing device and the program storage device, and multiple dedicated hardware circuits may be provided.

What is claimed is:

1. A control device for an internal combustion engine, wherein the internal combustion engine includes an exhaust gas control device in an exhaust passage, a plurality of cylinders, and a fuel injection valve for supplying fuel to each of the plurality of cylinders, the control device comprising:
   a central processing unit (CPU) and a non-transitory computer readable medium including instructions which, when executed by the CPU, cause the CPU to execute a stop process, a temperature acquisition process, an increase process, and a prohibition process;
   the stop process is a process for stopping supply of fuel to some of the plurality of cylinders of the internal combustion engine and continuing the supply of the fuel to remaining cylinders of the plurality of cylinders;
   the temperature acquisition process is a process for acquiring a temperature of the exhaust gas control device;
   the increase process is a process for increasing an injection amount injected by the fuel injection valve when the temperature becomes equal to or higher than a first temperature; and
   the prohibition process is a process for prohibiting both the stop process and the increase process from being executed at the same time.

2. The control device according to claim 1, wherein:
   the prohibition process is a process for prohibiting execution of the increase process when the stop process is being executed;
   the CPU and the non-transitory computer readable medium including the instructions, when executed by the CPU, further cause the CPU to execute a temperature control process when the stop process is executed; and
   the temperature control process includes a process for setting the injection amount injected by the fuel injection valve such that an air-fuel ratio of an air-fuel mixture in the remaining cylinders is richer than a stoichiometric air-fuel ratio when the temperature is lower than a second temperature, and reducing the injection amount injected by the fuel injection valve of the remaining cylinders when the temperature is equal to or higher than the second temperature.

3. The control device according to claim 2, wherein the second temperature is lower than the first temperature.

4. The control device according to claim 2, wherein the second temperature is higher than the first temperature.

5. The control device according to claim 1, wherein the prohibition process is a process for prohibiting execution of the stop process when the increase process is executed.

* * * * *